United States Patent [19]
Marks

[11] Patent Number: 5,969,602
[45] Date of Patent: Oct. 19, 1999

[54] EARLY WARNING BRAKING SYSTEM

[76] Inventor: LaKeith A. Marks, 17700 S. Avalon Blvd., Apt 217, Carson, Calif. 90746-1540

[21] Appl. No.: 08/968,647

[22] Filed: Nov. 12, 1997

[51] Int. Cl.⁶ ..................................................... B60Q 1/50
[52] U.S. Cl. ....................... 340/467; 340/479; 250/222.1; 250/229
[58] Field of Search ..................................... 340/467, 479, 340/463, 468, 464; 250/229, 221, 222.1

[56] References Cited

U.S. PATENT DOCUMENTS

| 4,894,652 | 1/1990 | Eckstein et al. | 340/479 |
|---|---|---|---|
| 4,988,862 | 1/1991 | Beltz . | |
| 5,111,182 | 5/1992 | Ishikawa et al. | 340/479 |
| 5,210,522 | 5/1993 | Hoekman et al. | 340/479 |
| 5,330,226 | 7/1994 | Gentry et al. . | |
| 5,410,148 | 4/1995 | Barron, Jr. et al. . | |
| 5,482,314 | 1/1996 | Corrado et al. . | |
| 5,528,698 | 6/1996 | Kamei et al. . | |
| 5,589,817 | 12/1996 | Furness | 340/463 |

Primary Examiner—Nina Tong

[57] ABSTRACT

The present invention relates to an early warning braking system whereby drivers are provided with the greatest opportunity to avoid a collision. This is accomplished by monitoring a drivers foot motions. When the braking process occurs, the drivers foot breaks an optical circuit, before engagement with the brake pedal, thereby illuminating the brake lights a moment in time before they would be normally illuminated. At 60 miles per hour this cold give a driver an additional 88 extra feet of braking distance.

1 Claim, 1 Drawing Sheet

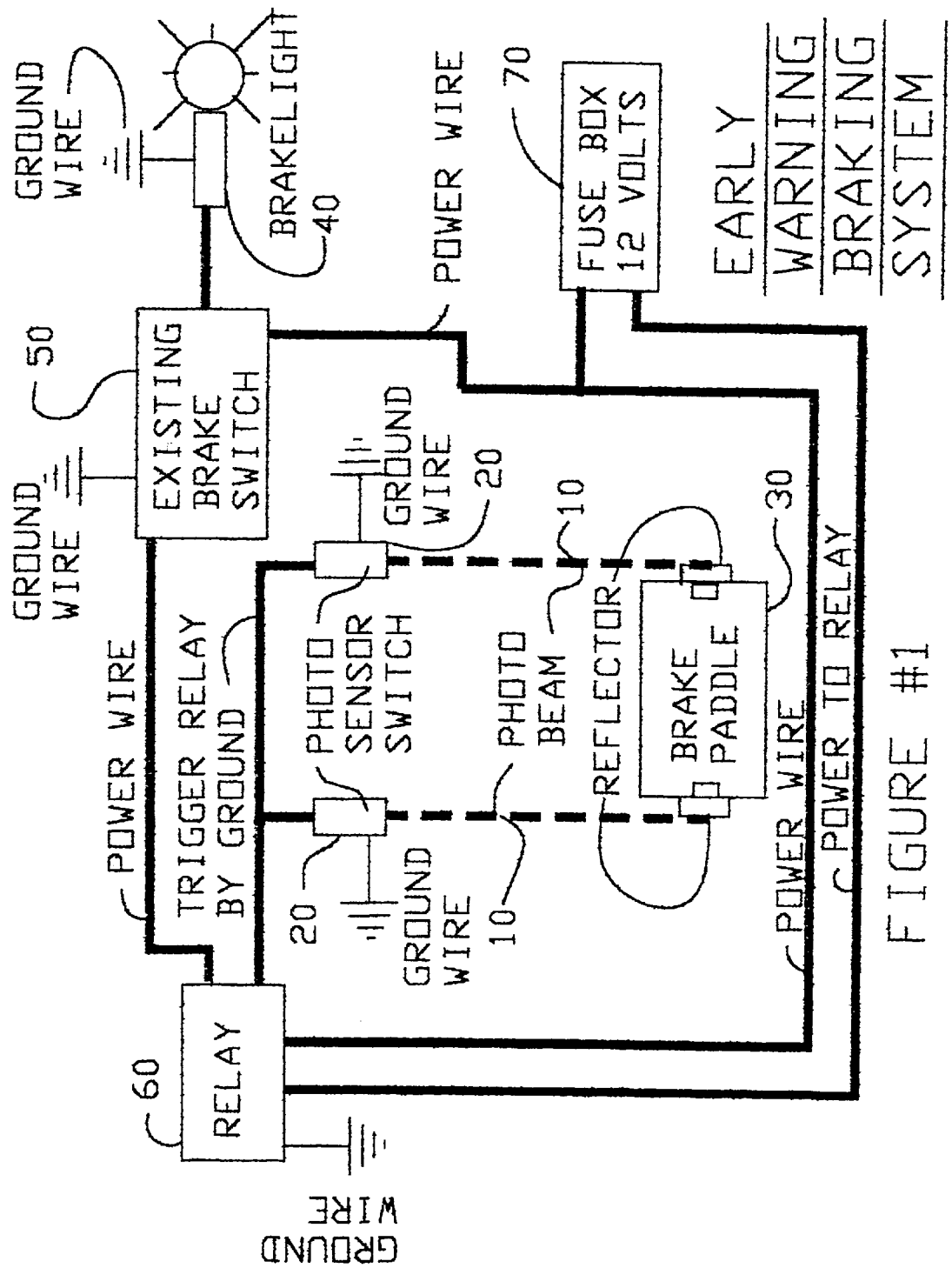

EARLY WARNING BRAKING SYSTEM

BACKGROUND OF THE INVENTION

1. Field of the Invention

The present invention relates to auto safety devices, and more particularly, to an auto safety device which alerts a driver in a first vehicle, following a second vehicle, of the second vehicle's impending stop.

2. Description of the Prior Art

In the field of auto safety, various measures have devised in order to reduce accident fatalities. Most recent efforts have concentrated on advanced air bag deployment methods to prevent passenger impact with the windshield and dashboard. Older approaches to auto safety involved improved bumpers and reinforced chassis designs.

In reality, however, no matter the effectiveness of impact minimizing devices, automobile collisions will always produce some injury. Moreover, regardless of automobile occupant injury, the shear cost of automobile accidents warrants attention. There is a compelling need for a device which prevents collisions from occurring.

While devising means to prevent passenger auto injuries is laudatory, the real solution to auto safety lies in accident prevention. No matter the number of safety devices designed to minimize auto passenger impact with the auto itself, there is no substitute for accident avoidance. Even with the various safety devices available today, accident statistics are staggering.

One of the most basic automobile collisions is the rear-end collision. Traffic moves and pauses so often during a typical drive that preventing rear-end collisions would significantly impact accident statistics. The frequency of rear-end collisions is staggering.

As described in the January 1997 Department of Transportation's Report to Congress on the National Highway Traffic Safety Administration Intelligent Transportation System Program, rear-end fatalities are of utmost concern.

> "A rear-end crash occurs when the front of a vehicle strikes the rear of a leading vehicle, both in the same lane. In 1994, there were approximately 1.66 million police-reported rear-end crashes. These crashes accounted for over 920,000 injuries and 1,160 fatalities. It is estimated that about 50 percent of these crashes could be avoided by collision avoidance systems that could sense stopped or moving vehicles in the forward lane."

In fact, the United States Government has dedicated resources to implementing a solution to the rear-end accident problem. The program, termed the Rear-end Collision Avoidance System (RECAS), is a long range attempt to introduce non-human responses to the driving environment.

> "The rear-end collision avoidance system (RECAS) concept is to monitor the forward path of the host vehicle, detect other vehicles and objects, and help the driver maintain a safe headway relative to a preceding vehicle (Category 1 system) or warn the driver if a collision is imminent (Category 2 system). At present, the technology to provide effective rear-end collision avoidance systems is generally believed to be more advanced than systems for some other collision types (e.g., run-off-the-road.).
>
> Intelligent cruise control (ICC) systems, currently being introduced to consumers abroad, will provide the foundation and experience to develop deployable RECAS. ICC systems do not detect stationary vehicles and will be capable of being activated by the driver at speeds above a manufacturer determined threshold. However, NHTSA views this project as a high priority effort since ICC has the potential for introduction of effective products by the automotive industry within the next 5–8 years."

Unfortunately, the government has not found a solution to rear-end collisions which can be implemented immediately. While the government has made preventing accidents a priority, there are several obstacles to overcome. For example, how will computer controlled devices interface with a driver? Will the automobile act on its own to avoid an accident, or will computer sensor devices enhance a driver's response time? An approach to integrating computers and humans has been realized by the Department of Transporation.

> "This project has developed performance requirements (both hardware and human factors) for advanced technologies to prevent or decrease the severity of rear-end crashes. This involves the identification of requirements for major system components (or subsystems) such as candidate sensor, processor, driver warning/interface, and control elements. This project is oriented toward countermeasure systems that would be self-contained within the vehicle, although it does not exclude from consideration those countermeasures that may require, or be improved by auxiliary equipment installed on the roadside or in other vehicles."

Clearly, a need exists for a reliable safety system which can be installed within a vehicle. The safety system will aim to prevent rear-end collisions by committing modern technology to a driver's learned behavior.

In summary, at the forefront of many individuals minds is preventing accidents before they occur. While air bags and seat belt laws have contributed to the reduction of accident fatalities, they are simply remedial measures. To effectively save lives, and lower insurance premiums, a method must be developed which is prophylactic.

The prior art discloses a number of safety devices, none of which speed the response time of the driver.

U.S. Pat. No. 4,988,862, issued to Beltz on Jan. 29, 1991, shows an optical occupant restraint activation sensor which works in conjunction with air bag systems to protect automobile passengers from front end collisions.

U.S. Pat. No. 5,330,226, issued to Gentry et al. on Jul. 19, 1994, shows a method and apparatus for detecting an out of position occupant. There is no photo sensor for detecting a driver's foot moving above the brake pedal of an automobile.

U.S. Pat. No. 5,410,148, issued to Barron, Jr. et al. on Apr. 25, 1995, shows a safety switch system with photooptical and capacitance detection for control of industrial machines.

U.S. Pat. No. 5,482,314, issued to Corrado et al. on Jan. 9, 1996, shows an automotive occupant sensor system which detects the characteristics of an individual in order to deploy and air bag.

U.S. Pat. No. 5,528,698, issued to Kamei et al. On Jun. 18, 1996, shows an automotive occupant sensing device which determines whether a suitable passenger is sitting in a seat before an air bag is deployed.

Therefore, there exists a need for an early warning braking system which employs conventional photooptical technology to increase the speed at which brake lights are illuminated.

SUMMARY OF THE INVENTION

The present invention was devised after the witnessing of a rear-end auto collision. The applicant realized that traditional methods of warning other drivers of an impending deceleration could be improved upon. Recognizing that in order to decrease the likelihood of a collision, drivers need, at the earliest possible moment, to be provided with information indicating a braking is about to, or is occurring, the applicant has devised the present invention.

Early notification that another vehicle is about to stop would allow other vehicles the greatest possible braking distance. By monitoring foot movement prior to engagement with the brake pedal, an earlier warning mechanism could be accomplished. Ergo, the present invention, the Early Warning Braking System, optically monitors foot motion.

The applicant has devised a system which triggers an automobile's rear break lights prior to the actual vehicle deceleration. According to the present invention, once a driver begins braking, his/her foot moves from the accelerator or a resting position (if the cruise control is engaged), toward the brake pedal. On its journey to the brake pedal, the foot breaks a predetermined optical beam; thereby, telegraphing the driver's intent to slow his/her vehicle. The broken optical beam is constantly monitored via a sensor, and when the broken beam is detected, the vehicle's taillights are instantly illuminated.

The present invention provides the driver behind the slowing vehicle up to one second of additional stopping time; at 60 miles per hour, that is 88 feet of extra stopping distance which decreases the opportunity for vehicular impact.

Accordingly, it is a principal object of the invention to provide a means to warn other drivers of an impending braking.

It is another object of the invention to provide a means for monitoring foot motion prior to engagement with the brake pedal.

It is a further object of the invention to provide a means for illuminating the taillights upon breaking of this optical circuit.

It is yet another object of the invention to provide other drivers with the greatest possible stopping distance, in the event of an emergency stop.

It is still a further an object of the invention to provide greater safety on the roads.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is schematic diagram of the early warning braking system.

DETAILED DESCRIPTION OF THE PREFERRED EMBODIMENT(S)

The present invention is constructed in the following manner. An optical beam 10 is placed strategically in the path between the driver (not shown) and the brake pedal 30 of a conventional automobile. Positioning of the photo sensor switch 20 and, if desired, a complementary reflector (not shown) can be selected for greatest effect depending on the model of the vehicle.

For example, one possible mounting scenario might include the reflector (not shown) or photo sensor switch 20 mounted to the brake pedal 30 with the optical beam 10 originating somewhere underneath the dashboard (not shown). Alternatively, it may by more prudent to place the optical beam 10 in the floor (not shown) with either a photo sensor switch 20 or a reflector (not shown) at a fixed position above the brake pedal.

A preferred embodiment of the present invention has the optical beam 10 positioned underneath the dashboard (not shown) such that should the driver's foot (not shown) move over a specific corner of the brake pedal 30, the path of the optical beam 10 will be obstructed. The photo sensor switch 20 is positioned at one corner of the brake pedal 30 so that as soon as movement is made over the brake pedal 30, the present invention will be activated. In any case, the optical beam 10 is generally positioned so that via a photo sensor switch 20 or a complementary reflector (not shown), movement of the driver's foot toward the brake pedal 30 is detected.

The optical beam 10 is by default in the 'on' position. Upon obstruction of the optical path, by passing the driver's foot (not shown) through the circuit, the photo sensor switch 20 activates a relay 60 which in turn illuminates the brake lights 40. The Early Warning Braking System bypasses the existing brake switch 50 and is separately fused 70. Therefore, in the event of a failure, the traditional depressing of the brake pedal 30 would activate the brake lights 40 as normal. However, in the operational mode, the present invention provides drivers with the greatest opportunity for avoiding a rear end collision.

Alternative embodiments of the present invention incorporate multiple optical beams 10 and photo sensor switches 20, with optional reflectors (not shown) to increase the chance that the driver's foot (not shown) moving over the break pedal 30 will be detected.

It is to be understood that the present invention is not limited to the embodiments described above, but encompasses any and all embodiments within the scope of the following claims.

I claim:

1. An early warning braking system comprising:

brake lights;

at least two reflectors are mounted to a brake pedal, and at least two photo sensor switches disposed in a place within a vehicle such that a respective light beam is positioned underneath the dashboard to complete a respective circuit;

wherein each reflector for ensuring a respective light path between the respective light beam and a respective photo sensor switch;

means for illuminating at least one of said brake lights when either one of the respective completed circuit is broken before the brake lights are normally illuminated by the brake pedal;

wherein each broken circuit is caused when the respective light path of said respective light beam is being obstructed by a driver's foot moves over the brake pedal, before engagement with the brake pedal during a braking process;

a relay is activated by either one of the respective photo sensor switch when the respective light path is obstructed;

means for bypassing an existing brake switch to illuminate said one of said brake lights such that the brake lights still able to be energized when said system is malfunction;

wherein said brake switch and said system are separately fused.

* * * * *